United States Patent
Carin et al.

(10) Patent No.: US 7,596,774 B2
(45) Date of Patent: Sep. 29, 2009

(54) HARD MACRO WITH CONFIGURABLE SIDE INPUT/OUTPUT TERMINALS, FOR A SUBSYSTEM

(75) Inventors: Caroline Carin, Grasse (FR); Emmanuel Alie, Grasse (FR)

(73) Assignee: NXP B.V., Eindhoven (NL)

(*) Notice: Subject to any disclaimer, the term of this patent is extended or adjusted under 35 U.S.C. 154(b) by 291 days.

(21) Appl. No.: 11/576,685

(22) PCT Filed: Sep. 21, 2005

(86) PCT No.: PCT/IB2005/053100

§ 371 (c)(1), (2), (4) Date: Apr. 4, 2007

(87) PCT Pub. No.: WO2006/038136

PCT Pub. Date: Apr. 13, 2006

(65) Prior Publication Data
US 2008/0088339 A1    Apr. 17, 2008

(30) Foreign Application Priority Data
Oct. 4, 2004    (EP) ................................ 04300650

(51) Int. Cl.
*G06F 17/50* (2006.01)
*G06F 7/38* (2006.01)
*H03K 19/00* (2006.01)

(52) U.S. Cl. .................... 716/17; 716/4; 716/6; 716/8; 716/14; 326/37; 326/38; 326/39; 326/41

(58) Field of Classification Search ................ 716/4, 716/6, 8, 14, 17; 326/37, 38, 39, 41; 324/537; 257/208
See application file for complete search history.

(56) References Cited

U.S. PATENT DOCUMENTS

| | | | | |
|---|---|---|---|---|
| 6,140,840 A | * | 10/2000 | Nakamura | 326/40 |
| 6,897,496 B2 | * | 5/2005 | Yamada et al. | 257/208 |
| 7,062,739 B2 | * | 6/2006 | Monthie et al. | 716/8 |
| 7,418,692 B2 | * | 8/2008 | Bansal | 716/17 |
| 7,421,674 B2 | * | 9/2008 | Nishida | 716/6 |
| 7,496,872 B2 | * | 2/2009 | Makino | 716/4 |
| 7,535,254 B1 | * | 5/2009 | Case | 326/39 |
| 2004/0006754 A1 | * | 1/2004 | Sonohara | 716/8 |
| 2009/0085577 A1 | * | 4/2009 | Butt et al. | 324/537 |

FOREIGN PATENT DOCUMENTS
WO    WO0154001 A    7/2001

* cited by examiner

*Primary Examiner*—Helen Rossoshek

(57) ABSTRACT

A hard macro device (HMD), for a subsystem (TMi) such as a data processor, comprises a processing core (C) provided with at least one time critical input terminal (CIT) adapted to feed it with time critical input data to be processed and at least one time critical output terminal (COT) adapted to deliver time critical output data it has processed. The processing core (C) is surrounded at least partly by a connecting interface zone (CIZ) comprising i) at least one input group of at least two time critical auxiliary input terminals (AITj), located at chosen locations and adapted to receive time critical input data to be processed, and/or at least one output group of at least two time critical auxiliary output terminals (AOTk), located at chosen locations and adapted to deliver processed time critical output data, ii) an input connecting means (LO) for connecting each time critical auxiliary input terminal (AITj) of this input group to the time critical input terminal (CIT), and/or iii) an output connecting means (Bk) for connecting the time critical output terminal (COT) to each time critical auxiliary output terminal (AOTk) of this output group.

12 Claims, 2 Drawing Sheets

HARD MACRO WITH CONFIGURABLE SIDE INPUT/OUTPUT TERMINALS, FOR A SUBSYSTEM

FIELD OF THE INVENTION

The present invention relates to the domain of chip layout design with multiple hard macros that are parts of data processing systems.

BACKGROUND OF THE INVENTION

As is known by one skilled in the art, data processing systems or subsystems, such as microprocessors, comprise elements dedicated to (a) chosen (elementary) task(s) or function(s), for instance a processor and its set of memories. At design level, the subsystem is called a top module; it generally comprises some glue logic and one or more hard macro (devices). A hard macro (device) is an element whose physical design is fixed and which must be used in a top module as it is. A hard macro comprises a processing core provided with at least one input terminal (or pin) adapted to feed it with input data to be processed and at least one output terminal (or pin) adapted to deliver output data processed by the core.

A hard macro device being an elementary brick, its core input and output terminals are always located at fixed locations. Certain input and output data being time critical, it is important to optimize the connection between the concerned terminals inside the subsystem (or top module) in order not to introduce high propagation delays which would penalize the next data processes and thus lower the subsystem's performances.

Such an optimization is possible when a hard macro device and its top module are developed (or designed) at the same time. But, when a hard macro device and its top module are developed (or designed) independently, their connections are rarely optimized (for instance a core input terminal may be located on a core side which is opposite to the area comprising the terminal to which it has to be connected). In this case (i.e when the hard macro device and top module are developed independently), one usually introduces feedthroughs in the hard macro layout to allow some flexibility. A feedthrough is a routed path through a hard macro, which allows going from a non functional additional input terminal on one side of the hard macro to a non functional additional output terminal on another side of the hard macro. Using this feedthrough allows for instance connecting one core output on one side of the hard macro to a core input terminal of the top module located near the opposite side of the hard macro without routing around the hard macro, which leads to a longer routed connection, and to further delay.

However, the available feedthroughs may remain (?) too long.

Moreover, a lot of care must be taken during the routing phase of the feedthroughs to avoid potential crosstalk. Indeed, the arrival time at a feedthrough input is difficult or impossible to know because it depends on the terminal to which it is connected and on the load of the external wiring used for connecting the hard macro device to the feedthrough terminals. Therefore, crosstalk violation analysis and suppression may be difficult and inaccurate, and often affect the timing model of the hard macro device, and may induce problem(s) in the data flow at a later processing stage.

SUMMARY OF THE INVENTION

Therefore, it is an object of this invention to improve the layout of the hard macro to give more flexibility during the later or simultaneous design stage of a subsystem (or top module).

For this purpose, it provides a hard macro device, for a subsystem (or top module), comprising a processing core provided with at least one time critical input terminal adapted to feed it with time critical input data to be processed and at least one time critical output terminal adapted to deliver time critical output data processed by said core.

This hard macro device is characterized in that its core is at least partly surrounded by (or wrapped with) a connecting interface zone comprising:

- at least one input group of at least two time critical auxiliary input terminals adapted to receive the time critical input data to be processed (when they are connected to top module terminals), and/or at least one output group of at least two time critical auxiliary output terminals adapted to deliver the processed time critical output data (to the top module terminal for which they are intended),
- an input connecting means for connecting each time critical auxiliary input terminal of the input group to the time critical input terminal, and/or
- an output connecting means for connecting the time critical output terminal to each time critical auxiliary output terminal of the output group.

In this manner, delays can be minimized between at least one time (or timing) critical output of the hard macro and one time (or timing) critical input terminal of the top level module, and/or between at least one time (or timing) critical output of the subsystem (or top module) and one time (or timing) critical input terminal of the hard macro, irrespective of the locations of the time (or timing) critical inputs/outputs of the subsystem (or top module).

The hard macro device according to the invention may include additional characteristics, considered separately or combined, and notably:

- the input connecting means may comprise at least one integrated component (defining a logical OR gate) connected to the time critical input terminal and to as many input conductive tracks as time critical auxiliary input terminals in one input group, each input conductive track being connected to one of the time critical auxiliary input terminals,
- the output connecting means may comprise as many output conductive tracks as time critical auxiliary output terminals in each output group, each output conductive track connecting one of the time critical auxiliary output terminals to the time critical output terminal. For instance, each of these output conductive tracks comprises a buffer component for buffering the processed time critical output data to be delivered,
- the connecting interface zone may at least partially surround the core, and the time critical auxiliary input and/or or output terminals of the input and/or output groups may be located on at least two sides of the connecting interface zone. For instance, the connecting interface zone comprises four sides perpendicular to one another and fully surrounding the core, and it also comprises an input group having a maximum of four time critical auxiliary input terminals each located on one of its sides, and/or an output group comprising at least four time critical auxiliary output terminals each located on one of its sides, the core may comprise at least one non-time critical input terminal adapted to feed it with non-time critical input data to be processed and at least one non-time critical output terminal adapted to deliver non-time critical output data processed by the core, and the connecting interface zone may comprise i) as many non-time critical auxiliary input terminals as non-time critical input terminals and as many auxiliary input conductive tracks as non-time critical input terminals, each auxiliary input conductive track connecting one of the non-time critical auxiliary input terminals to a corresponding one of the non-time critical input terminals, and ii) as many non-time critical auxiliary output terminals as non-time critical output terminals and as many auxiliary output conductive tracks as non-time critical output terminals, each auxiliary output conductive track connecting one of the non-time critical auxiliary output terminals to a corresponding one of the non-time critical output terminals.

The core and its connecting interface zone can be used to design a new flexible hard macro device according to the invention.

The invention also provides a subsystem (or top module), such as a data processor (for instance a microprocessor), comprising at least one hard macro device such as the one introduced above.

This invention applies to any kind of hard macro, and for instance to memories which are widely used in many subsystems.

BRIEF DESCRIPTION OF THE DRAWINGS

Other features and advantages of the invention will become apparent on examining the detailed specifications given hereinafter and the appended drawings, wherein.

The appended drawings may not only serve to complete the invention, but also to contribute to its definition, if need be.

DESCRIPTION OF PREFERRED EMBODIMENTS

Figure 1:
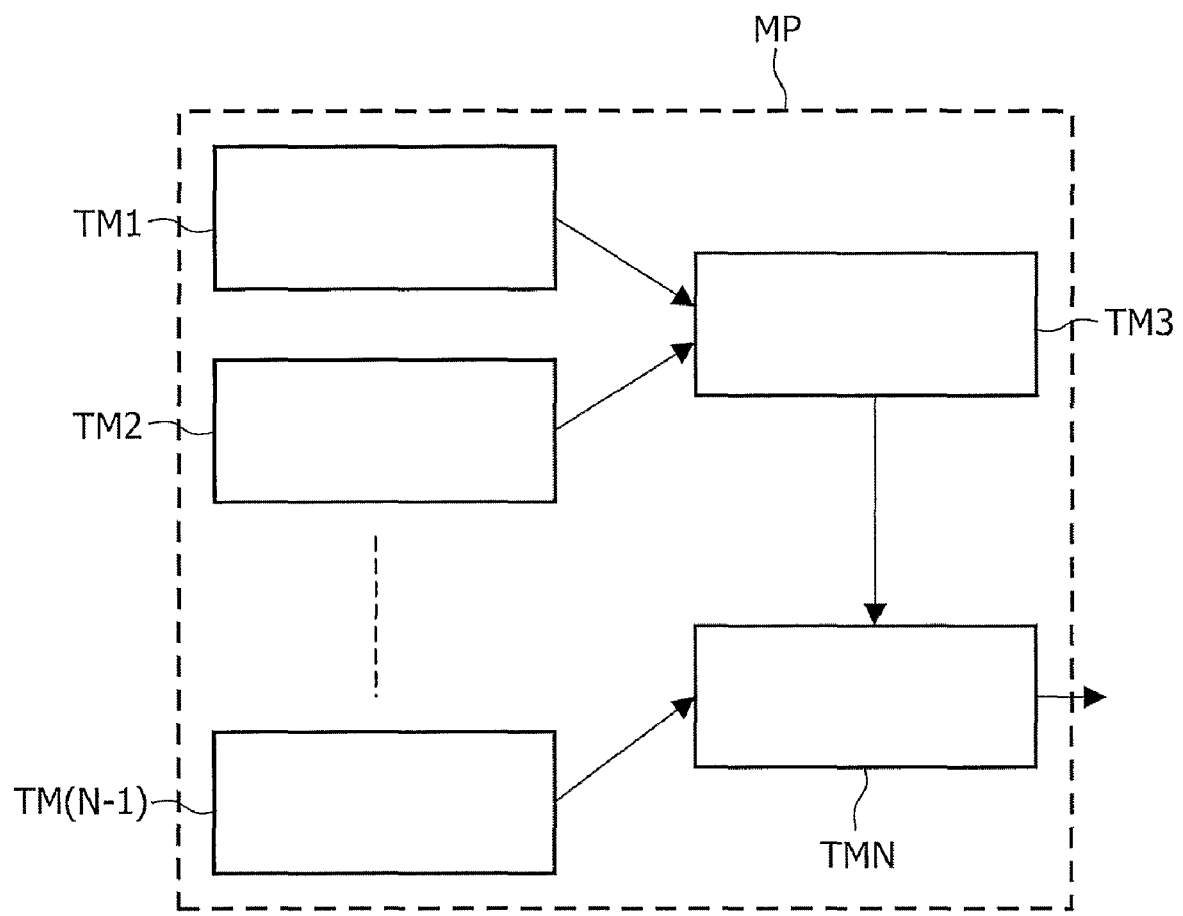
FIG. 1 schematically illustrates a part of a (data processing) system comprising several (data processing) subsystems, and FIG. 2 schematically illustrates an example of an embodiment of a subsystem (or top module) comprising a hard macro device according to the invention.

Reference is initially made to FIG. 1 to describe an example of a data processing system MP comprising subsystems (or top modules) TMi, such as microprocessors, in which the invention may be applied.

In the following description it will be assumed that the system MP is intended for electronic equipment such as a mobile phone, for instance a GSM/GPRS or UMTS mobile phone. But it is important to note that the invention is not limited to this type of electronic equipment. Indeed, the invention may be applied to any type of electronic equipment comprising one or more systems, each comprising one or more data processors or subsystems for data processing purposes, and notably to computers.

As mentioned in the introductory part, a data processing system MP usually comprises a lot of subsystems or top modules TMi (here I=1 to N) that are dedicated to (a) chosen (elementary) task(s) or function(s) and are connected to one another to define data processing chain(s). For instance, in the non limiting illustrated example, the first TM1 and second TM2 top modules feed the third top module TM3 with processed data, and the third TM3 and $N^{th}$-1 TM(N-1) top modules feed the $N^{th}$ top module TMN with processed data, so that it could deliver processed data for a communication application for instance.

Each top module TMi comprises one or more elementary bricks, which are referred to as hard macro (devices) by those skilled in the art, and which are usually dedicated integrated circuits (made of hardware (or electronic components)). Each hard macro device is dedicated to one or more elementary processing tasks on input data delivered by another top module or another hard macro device of its own top module, and outputs processed data intended for still another top module or another hard macro device of its own top module.

Figure 2:
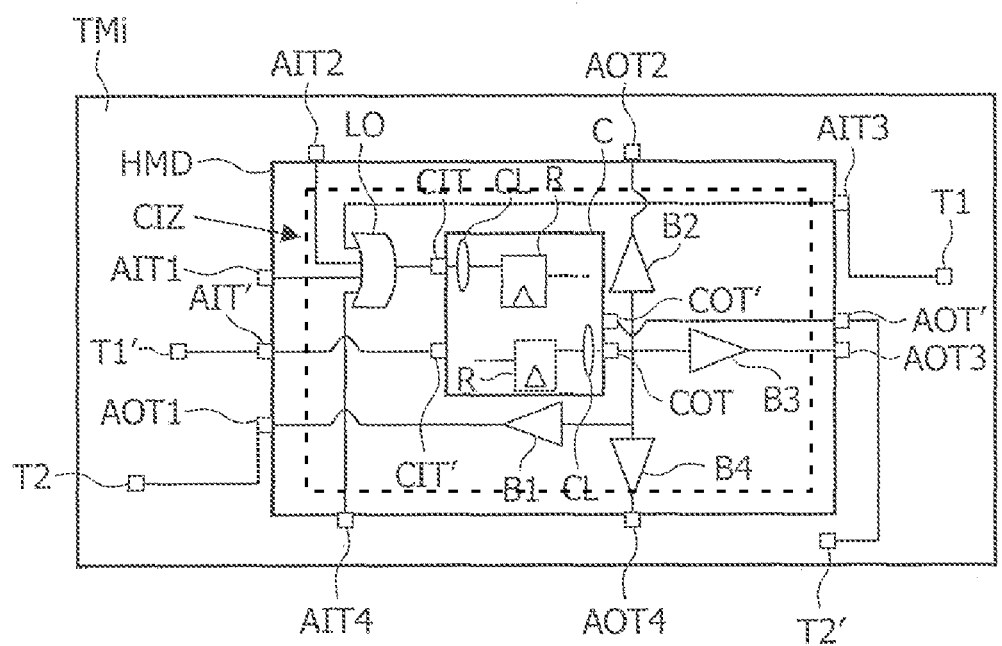

Reference is now made to FIG. 2 to describe a non limiting example of an embodiment of a subsystem or top module TMi according to the invention.

The top module TMi illustrated in FIG. 2 only comprises one hard macro device HMD, but as mentioned above it can comprise two or three, or even more, hard macro devices that may be connected to one another through terminals (or pins) and conductive tracks (or paths).

According to the invention, the hard macro device HMD comprises a processing core C which is at least partly surrounded by (or wrapped with) a connecting interface zone CIZ. Referring to FIG. 2, the CIZ is denoted by a dashed line. In the illustrated example, the processing core C has a virtual rectangular shape (because it is not physically implemented; only the hard macro device HMD that is physically implemented has a rectangular or rectilinear shape) and is surrounded on its "four sides" by the connecting interface zone CIZ. But it could also be surrounded on only one "side", two "sides" or three "sides". More generally, the core C is at least partly surrounded.

The processing core C is unchanged compared to a well-known processing core of the state of art. So, it is provided with at least one time critical input terminal (or pin) CIT adapted to feed it with time critical input data to be processed and at least one time critical output terminal (or pin) COT adapted to deliver time critical output data processed by said core C. In the illustrated example, the processing core C comprises only one time critical input terminal CIT and only one time critical output terminal COT. But, it could comprise two or more time critical input terminals CIT and/or two or more time critical output terminals COT. It is important to note that the number of time critical input terminals CIT is not necessarily equal to the number of time critical output terminals COT.

In the illustrated example, the processing core C also comprises one non-time critical input terminal CIT' and one non-time critical output terminal COT'. But this is not mandatory. Moreover, it could comprise two or more non-time critical input terminals CIT' and/or two or more non-time critical output terminals COT'. It is important to note that the number of non-time critical input terminals CIT' is not necessarily equal to the number of non-time critical output terminals COT'.

Each time critical core input terminal CIT, each time critical core output terminal COT, each non-time critical core input terminal CIT' and each non-time critical core output terminal COT', is connected to one or more electronic integrated components, such as a combinational logic cell CL and a register R, which are arranged to process the input data they receive.

With each time critical input terminal CIT there is associated one input group of at least two time critical auxiliary input terminals AITj, which are adapted to receive time critical input data to be processed. Furthermore, with each time critical output terminal COT there is associated one output group of at least two time critical auxiliary output terminals AOTk which are adapted to deliver processed time critical output data. In the illustrated example, j=1 to 4 and k=1 to 4, but j and k only have to be equal to or greater than 2. Moreover, the number j of time critical auxiliary input terminals AITj may be different from the number k of time critical auxiliary output terminals AITk.

These time critical auxiliary input terminals AITj and time critical auxiliary output terminals AOTk are defined at chosen different locations on the external border of the connecting interface zone CIZ. In the illustrated example, the four time critical auxiliary input terminals AIT1 to AIT4 are respectively located on the external border of the four sides of the connecting interface zone CIZ, and the four time critical auxiliary output terminals AOT1 to AOT4 are also respectively located on the external border of the four sides of the connecting interface zone CIZ. But this is not mandatory. Any combination of locations may be envisaged on each side of the connecting interface zone CIZ. It is even possible to define all time critical auxiliary input terminals AITj and all time critical auxiliary output terminals AITk on the same side of the connecting interface zone CIZ. But it is generally more convenient to distribute the different time critical auxiliary input terminals AITj and the time critical auxiliary output terminals AITk on the different sides of the connecting interface zone CIZ.

In the illustrated example, the connecting interface zone CIZ also comprises one non-time critical auxiliary input terminal AIT' and one non-time critical auxiliary output terminal AOT'. In fact, the connecting interface zone CIZ must have as many non-time critical auxiliary input terminals AIT' as non-time critical input terminals CIT' and as many non-time critical auxiliary output terminals AOT' as non-time critical output terminals COT'.

The non-time critical auxiliary input terminal AIT' is connected to the non-time critical input terminal CIT' through a conductive track (or path) defined in the connecting interface zone CIZ, and the non-time critical auxiliary output terminal AOT' is connected to the non-time critical output terminal COT' through a conductive track (or path) defined in the connecting interface zone CIZ. It does not really matter whether these conductive tracks are short or not, because they only have to transport non-time critical data.

The connecting interface zone CIZ further comprises an input connecting means for connecting each of the time critical auxiliary input terminals AITj to the corresponding time critical core input terminal CIT, and an output connecting means for connecting the time critical core output terminal COT to each of the corresponding time critical auxiliary output terminals AOTk.

For instance, and as illustrated in FIG. 2, the input connecting means may comprise an integrated component defining a logical OR gate LO which is connected to the time critical core input terminal CIT and to as many input conductive tracks as there are time critical auxiliary input terminals AITj. Each input conductive track is defined in the connecting interface zone CIZ and is connected to one of the time critical auxiliary input terminals AITj.

It is important to note that when the processing core C comprises M time critical core input terminals CITm (m=1 to M), the input connecting means comprises M integrated components defining M logical OR gates LOm each dedicated to one of the M time critical core input terminals CITm and each connected to an input group of at least two time critical auxiliary input terminals AITjm.

For instance, and as illustrated in FIG. 2, the output connecting means may comprise as many output conductive tracks as time critical auxiliary output terminals AOTk. Each output conductive track-is defined in the connecting interface zone CIZ and connects one of the time critical auxiliary output terminals AOTk to one time critical core output terminal COT.

It is important to note that when the processing core C comprises P time critical core output terminals COTp (p=1 to P), the output connecting means comprises P groups of output conductive tracks each dedicated to one of the P time critical core input terminals COTp and each connected to one of P output groups of at least two time critical auxiliary output terminals AOTkp.

For instance, and as illustrated in FIG. 2, each of the output conductive tracks, dedicated to one of the time critical auxiliary output terminals AOTh, comprises one or more integrated components defining a buffer Bk (here k=1 to 4) for buffering the processed time critical output data to be delivered to the corresponding time critical auxiliary output terminals AOTk.

When a hard macro device HMD must be integrated in a top module TMi, it is necessary to first determine the location of each top module terminal to which every one of its time critical core input terminal CIT, non-time critical core input terminal CIT', time critical core output terminal COT and non-time critical core output terminal COT' must be connected.

Next, it has to be determined which is the best time critical auxiliary input terminal AITj for each corresponding time critical core input terminal CIT, taking into account the location of the top module terminal to which it must be connected, and which is the best time critical auxiliary output terminal AOTk for each corresponding time critical core output terminal COT, taking into account the location of the top module terminal to which it must be connected. By "best time critical auxiliary input or output terminal" is meant the time critical auxiliary input or output terminal which is the nearest to the top module terminal concerned.

And finally, it is necessary to define in the top module TMi each conductive track (or path) intended for connecting each determined time critical auxiliary input or output terminal to the corresponding top module terminal.

Every time critical auxiliary input terminal AITj which has not been selected is set to zero potential.

It is important to note that a top module terminal may be either a dedicated terminal, when the corresponding time critical or non-time critical core input or output terminal must be connected to a component which is not located in its own top module, or a time critical or non-time critical auxiliary input or output terminal, when the corresponding time critical or non-time critical core input or output terminal must be connected to a component which is located inside its own top module (for instance another hard macro device).

In the non limiting example illustrated in FIG. 2, the third time critical auxiliary input terminal AIT3 is connected to a first top module terminal T1 through a conductive track and to the time critical core input terminal CIT through the logical OR gate LO, the non-time critical auxiliary input terminal AIT' is connected to a second top module terminal T1' through a conductive track and to the non-time critical core input terminal CIT through another conductive track, the first time critical auxiliary output terminal AOT1 is connected to a third top module terminal T2 through a conductive track and to the time critical core output terminal COT through a conductive track comprising the first buffer B1, and the non-time critical auxiliary output terminal AOT' is connected to a fourth top module terminal T2' through a conductive track and to the non-time critical core output terminal COT' through another conductive track.

The subsystem (or top module) TMi according to the invention may be an integrated circuit realized in CMOS technology or in any technology used in chip industry manufacturing.

Thanks to the invention, the model generation for the static timing analysis is easier to create and use. All possible paths are analysed, whether they are finally used or not, and they are fully defined, including the crosstalk effects, which allows a best timing analysis accuracy. Moreover, every hard macro device may now be used in any environment at the best compromise between performance and reusability.

The invention is not limited to the exemplary embodiments of a hard macro device and subsystem (or top module) described above, but it encompasses all alternative embodiments which may be considered by a person skilled in the art, within the scope of the appended claims.

The invention claimed is:

1. Hard macro device (HMD) for a subsystem (TMi), said hard macro device (HMD) comprising
    a processing core (C) provided with at least one time critical input terminal (CIT) adapted to feed it with time critical input data to be processed and at least one time critical output terminal (COT) adapted to deliver time critical output data it has processed, wherein processing core (C) is surrounded at least partly with a connecting interface zone (CIZ) with an external border having one or more sides, the (CIZ) including,
        i) at least one input group of at least two time critical auxiliary input terminals (AITj), located at predetermined sides on the external border of the (CIZ) and adapted to receive time critical input data to be processed, and at least one output group of at least two time critical auxiliary output terminals (AOTk), located at predetermined sides on the external border of the (CIZ) and adapted to deliver processed time critical output data, the critical auxiliary input terminals (AITj) and critical auxiliary output terminals (AOTk) located at the border of the HMD,
        ii) an input connecting means (LO) for connecting each time critical auxiliary input terminal (AITj) of said input group to said time critical input terminal (CIT), and
        iii) an output connecting means (Bk) for connecting said time critical output terminal (COT) to each time critical auxiliary output terminal (AOTk) of said output group.

2. Hard macro device according to claim 1, characterized in that said input connecting means comprises at least one integrated component (LO) defining a logical OR gate connected to said time critical input terminal (CIT) and to as many input conductive tracks as time critical auxiliary input terminals (AITj) in said input group, each input conductive track being connected to one of said time critical auxiliary input terminals (AITj).

3. Hard macro device according to claim 1, characterized in that said output connecting means (Bk) comprises as many output conductive tracks as time critical auxiliary output terminals (AOTk) in said output group, each output conductive track connecting one of said time critical auxiliary output terminals (AOTk) to said time critical output terminal (COT).

4. Hard macro device according to claim 3, characterized in that each of said output conductive tracks comprises a buffer component (Bk) for buffering processed time critical output data to be delivered.

5. Hard macro device according to claim 1, characterized in that said connecting interface zone (CIZ) at least partly surrounds said processing core (C), and in that said time critical auxiliary input terminals (AITj) of said input group are located on at least two sides of said connecting interface zone (CIZ), and said time critical auxiliary output terminals (AOTk) of said output group are located on said two sides of said connecting interface zone (CIZ).

6. Hard macro device according to claim 5, characterized in that said connecting interface zone (CIZ) comprises four sides perpendicular to one another and fully surrounding said core (C), and it also comprises an input group having a maximum of four time critical auxiliary input terminals (AITj) each located on one of its sides.

7. Hard macro device according to claim 5, characterized in that said connecting interface zone (CIZ) comprises four sides perpendicular to one another and fully surrounding said core (C), and it also comprises an output group of at least four time critical auxiliary output terminals (AOTk) each located on one of its sides.

8. Hard macro device-according to claim 1, characterized in that said processing core (C) comprises
    at least one non-time critical input terminal (CIT') adapted to feed it with non-time critical input data to be processed and at least one non-time critical output terminal (COT') adapted to deliver non-time critical output data processed by said core (C), and in that said connecting interface zone (CIZ) comprises
    i) as many non-time critical auxiliary input terminals (AIT') as non-time critical input terminals (CIT') and as many auxiliary input conductive tracks as non-time critical input terminals (CIT'), each of said auxiliary input conductive tracks connecting one of said non-time critical auxiliary input terminals (AIT') to a corresponding one of said non-time critical input terminals (CIT'), and
    ii) as many non-time critical auxiliary output terminals (AOT') as non-time critical output terminals (COT') and as many auxiliary output conductive tracks as non-time critical output terminals (COT'), each of said auxiliary output conductive tracks connecting one of said non-time critical auxiliary output terminals (AOT') to a corresponding one of said non-time critical output terminals (COT').

9. Hard macro device according to claim 1, characterized in that it constitutes an integrated circuit.

10. Subsystem (TMi) characterized in that it comprises at least one hard macro device (HMD) according to claim 1.

11. Subsystem according to claim 10, characterized in that it constitutes a data processor.

12. Subsystem according to claim 11, characterized in that said data processor is a microprocessor.

* * * * *